C. De Damseaux,

Track-Layer.

No. 85,569. Patented Jan. 5, 1869.

Witnesses.
H. C. Ashkettle
Alex F. Roberts

Inventor.
C. de Damseaux
per Munn & Co.
Attorneys

UNITED STATES PATENT OFFICE.

CHARLES DE DAMSEAUX, OF NEW YORK, N. Y.

Letters Patent No. 85,569, dated January 5, 1869.

IMPROVED TRACK-LAYING VEHICLE.

The Schedule referred to in these Letters Patent and making part of the same.

*To all whom it may concern:*

Be it known that I, CHARLES DE DAMSEAUX, of the city, county, and State of New York, have invented a new and useful Improvement in Vehicles; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
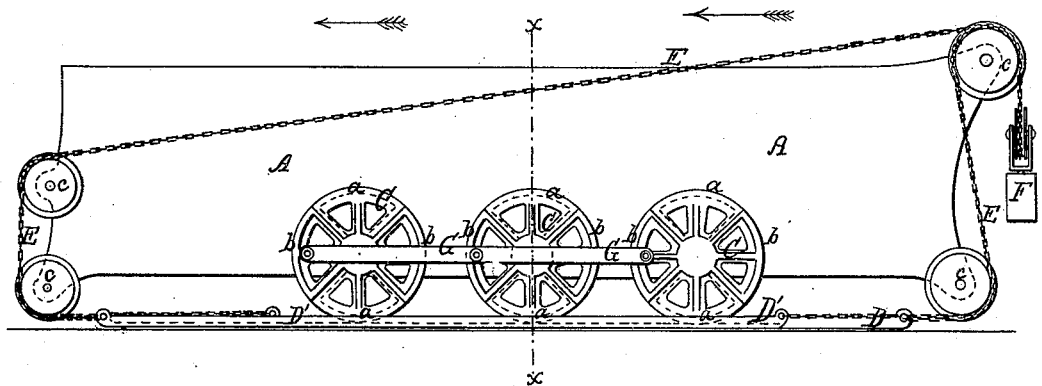
Figure 1 represents a side elevation of my improved vehicle.

This invention relates to a new manner of arranging the wheels of cars and wagons, and of connecting them with sliding rails, so that the rails will be automatically placed below the wheels as the vehicle progresses in either direction.

The invention consists in the use of segmental wheels, arranged side by side in such a manner that a certain number of segments serve to make up a whole wheel.

In connection with these wheels are arranged sliding rails, which are at both their ends secured to weighted chains or ropes, and which lie on the ground to form the treading-surfaces for the wheels.

Two or more wheels are arranged on each side of a vehicle, and a rail is arranged under each lateral set of segments. As the vehicle advances, one such set of segments rests upon its rail, and moves thereon, while the other rail is free, and is, by its system of chains, pulled forward into position, so as to be under the other set of segments, when that commences to roll and to support the vehicle.

When the second set of segments gets into action, the first set looses its contact with its rail, and the first rail is thus liberated, and is drawn forward, ready to receive and sustain its segments, when they come into action again.

By this system of wheels and rails a self-track-laying vehicle is produced, which will be found convenient for many purposes where railroads are now used.

A, in the drawing, represents the box or frame of a wagon or car, of suitable size and description.

On each side of the same are mounted or hung, on suitable axles, B B, two or more wheels, C C, each wheel consisting of two or more segments, $a\ b$, the combined arches of which, in one wheel, making up the whole periphery of the wheel.

In the drawing, the wheels are represented as consisting each of four segments, $a\ a$ and $b\ b$, each a quadrant of the whole wheel.

Figure 3:
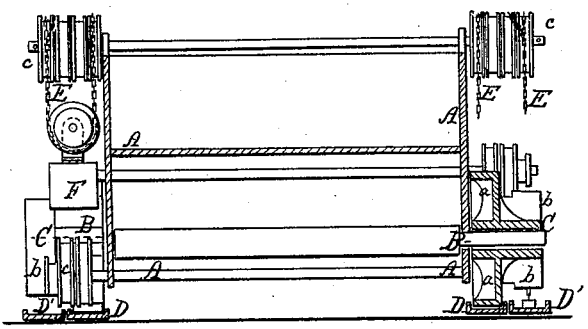
Figure 3 is a vertical transverse section of the same, taken on the plane of the line $x\ x$, fig. 1.

The two opposite segments, $a\ a$, are set nearer to the body of the wagon than the other two segments, $b\ b$, the outer surface of the segments $a$ being either in line with or at a distance from the inner surface of the outer segments, $b\ b$, as indicated in fig. 3.

D D' are the sliding rails. They are made of sheet-metal or other suitable material, as wide as or wider than the treading-edges of the segments. One rail is arranged below each set of segments. Thus, the rail D is under the segments $a$ of all the wheels on one side of the vehicle, while the rail D' is under the segments $b$ of the same set of wheels.

Each rail is at both ends connected with a system of chains, E E, which pass over pulleys $c\ c$, fitted on the side of the vehicle, and which are kept tense by means of a weight or weights, F, as shown.

The various wheels on one side of the vehicle may be connected by means of a rod, G, for the purpose of obtaining uniform motion.

As the vehicle is moved forward, one set of segments is on its rail, while the other set is not in contact with its rail, and the free rail is, by the weight F, drawn forward. Thus, in fig. 1, the segments $a$ are on their rail D, while the segments $b$ leave the rail D' free to be set. As soon as the segments $a$ leave their rail, the segments $b$ reach theirs, and D is then set, by the weight, to keep pace with the moving vehicle. As long as the segments are in contact with a rail, such rail is held at rest, and is only moved forward when it is liberated again.

Figure 2:
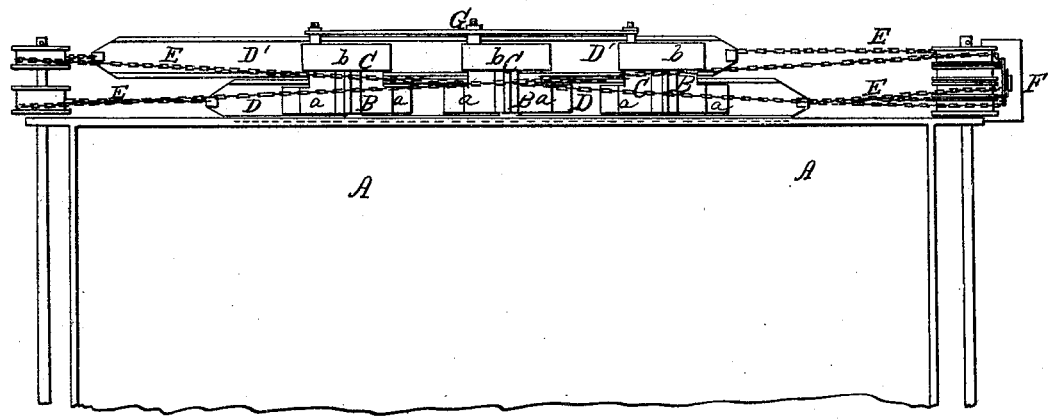
Figure 2 is a detail plan or top view of the same.

By properly arranging the chain-work, the rails will be drawn forward in whatever direction the vehicle may move. This object is, for example, attained by connecting the rear end of the rail D with the front end of D', and the rear end of D' with the front end of D, the chains crossing each other, as in fig. 2. When, then, the vehicle moves in the direction of the arrow in fig. 1, the weight will come always nearer to the rear end of D, and the chain will be slackened behind D and in front of D', the slack being removed by the weight drawing the rail D' forward. If the vehicle would move in the opposite direction, the then rear pulleys $c$ will move towards the then front end of D, and will thereby serve to slacken the chains in rear of D, and cause the consequent forward motion of D'. Thus, by using the system of crossed chains, the chains connecting the rear end of the fixed rail with the front end of the loose rail will always be acted upon by the weight, to draw forward the loose rail, in whatever direction the vehicle may move.

Having thus described my invention,

What I claim as new, and desire to secure by Letters Patent, is—

1. The wheels C, composed each of two sets of segments, $a\ b$, so arranged as to form a double tread, adapted for use with the moving rails D D' substantially as herein shown and described for the purpose specified.

2. The sliding rails D D', when arranged under and in combination with the segmental wheels C of a vehicle, substantially as herein shown and described.

3. The rails D D', when connected, by a system of chains or ropes, E E, with the body of the vehicle, when such vehicle is provided with segmental wheels C C, substantially as set forth.

CH. DE DAMSEAUX.

Witnesses:
WM. F. MCNAMARA,
ALEX. F. ROBERTS.